No. 851,540. PATENTED APR. 23, 1907.
P. MARTIN.
DRIVING MECHANISM FOR SELF PROPELLED VEHICLES OR VESSELS.
APPLICATION FILED JUNE 1, 1905.
3 SHEETS—SHEET 1.
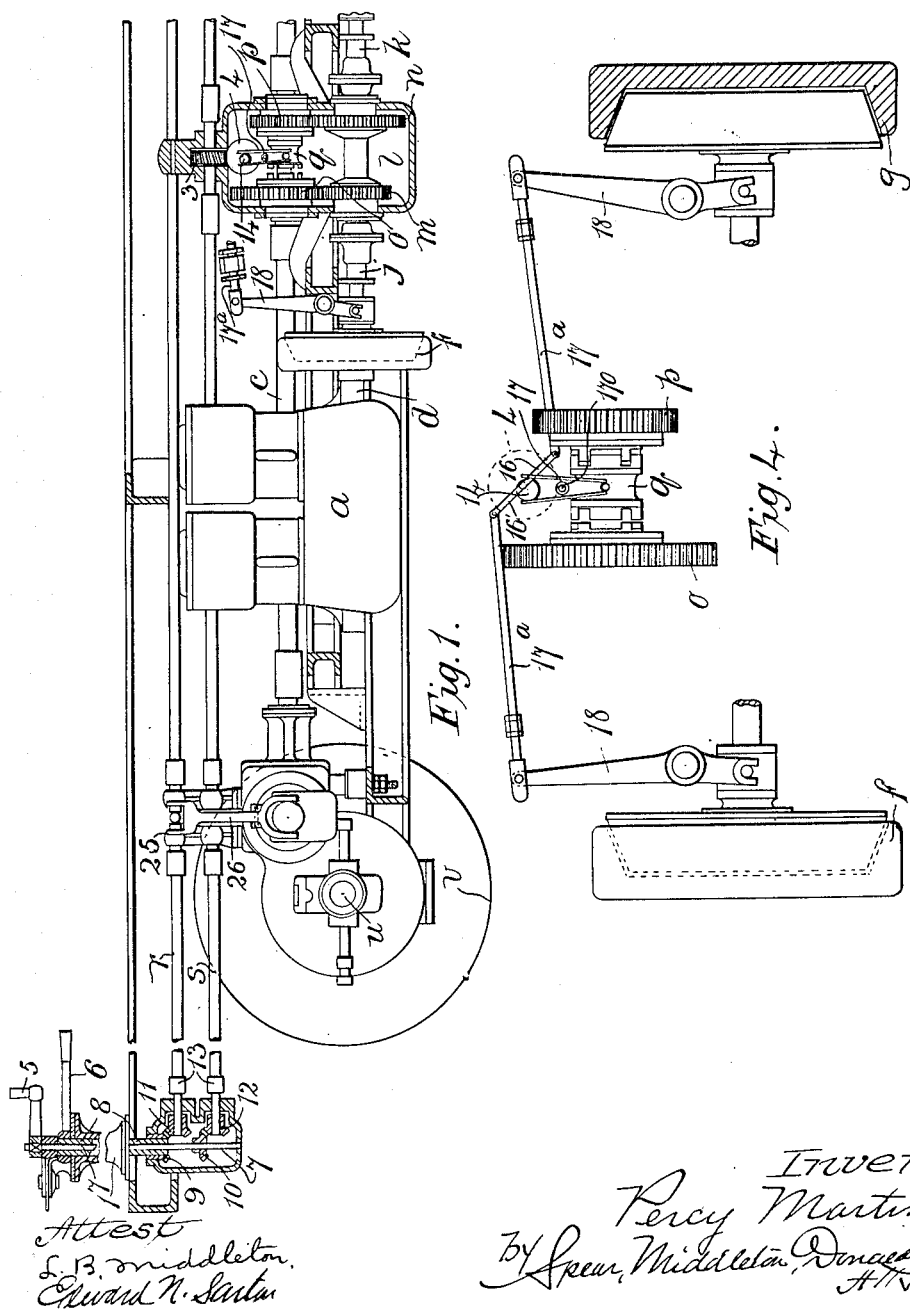

No. 851,540. PATENTED APR. 23, 1907.
P. MARTIN.
DRIVING MECHANISM FOR SELF PROPELLED VEHICLES OR VESSELS.
APPLICATION FILED JUNE 1, 1905.
3 SHEETS—SHEET 2.
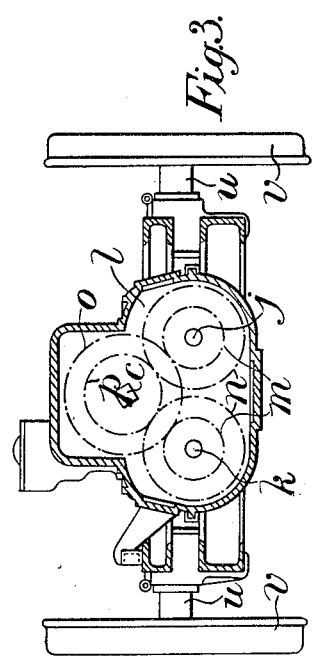
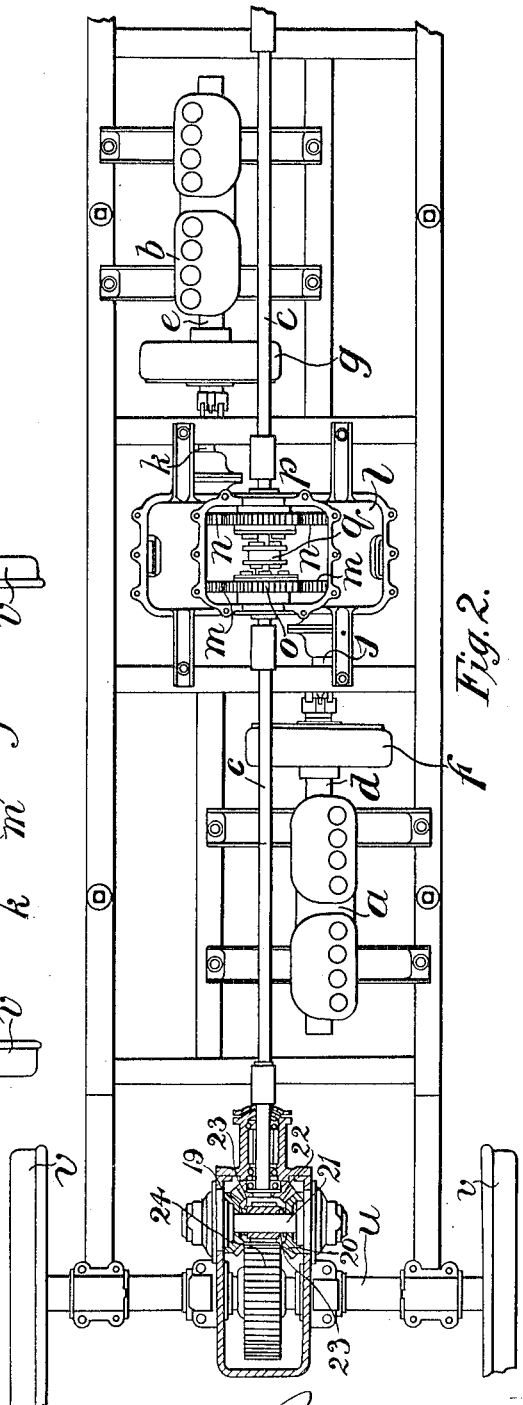

No. 851,540. PATENTED APR. 23, 1907.
P. MARTIN.
DRIVING MECHANISM FOR SELF PROPELLED VEHICLES OR VESSELS.
APPLICATION FILED JUNE 1, 1905.
3 SHEETS—SHEET 3.
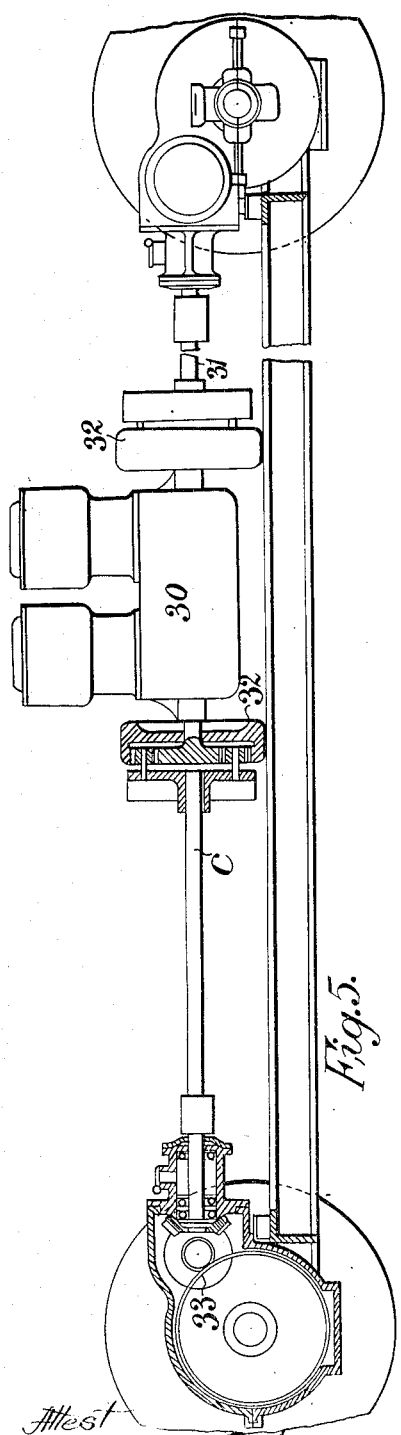
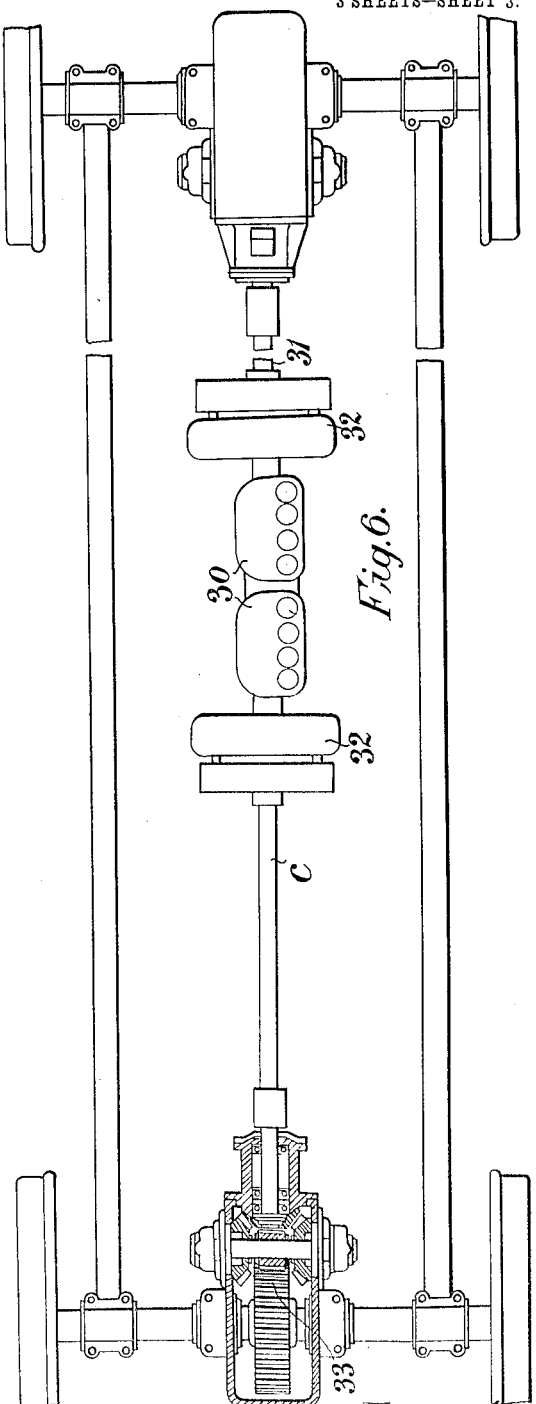

UNITED STATES PATENT OFFICE.

PERCY MARTIN, OF LONDON, ENGLAND, ASSIGNOR OF ONE-HALF TO DICK KERR & COMPANY, LIMITED, OF LONDON, ENGLAND.

DRIVING MECHANISM FOR SELF-PROPELLED VEHICLES OR VESSELS.

No. 851,540.      Specification of Letters Patent.      Patented April 23, 1907.

Application filed June 1, 1905. Serial No. 263,345.

*To all whom it may concern:*

Be it known that I, PERCY MARTIN, a citizen of the United States of America, and residing at 219 Shaftesbury avenue, London, W. C., England, have invented certain new and useful Improvements in and Relating to Driving Mechanism for Self-Propelled Vehicles and Vessels, of which the following is a specification.

This invention relates to power transmission in self propelled vehicles or vessels which may be used for traction and similar purposes.

In applying internal combustion engines to vehicles for roads or railways, especially where great tractive efforts are necessary, it is essential that means be provided to allow of the attainment of large starting efforts, a variable tractive effort and speed and reversal of motion.

The invention also consists in various arrangements of mechanism for driving vehicles and vessels hereinafter described.

The invention further consists in improvements in the controlling mechanism hereinafter described.

By means of the invention maximum traction and a convenient driving and control are obtained.

Referring to the accompanying drawings; Figure 1 is a part side elevation and Fig. 2 a part plan of one modification of my invention; Fig. 3 being a sectional view of the gear box; Fig. 4 is an enlarged view of part of the controlling mechanism; Fig. 5 is a side elevation; and Fig. 6 is a plan of another modification.

In the arrangement shown in Figs. 1 to 4 I place two internal combustion engines, $a$, $b$, one on each side of a longitudinal shaft, $c$, with their crank shafts, $d$, $e$, parallel to said shaft. On the crank shafts $d$, $e$, are mounted two main clutches, $f$, $g$, operated by the levers $17^a$, 18, whereby the engines may be put into or withdrawn from engagement with the transmission gear without shock.

The engines by means of the clutches $f$, $g$, drive two intermediate shafts, $j$, $k$, in a gear box, $l$, between the engines. On each of the shafts, $j$, $k$, are mounted a small and large pinion, $m$, $n$, respectively; the smaller pinions $m$, are permanently geared to the larger $o$, of gear wheels, $o$, $p$, which are loosely mounted on the longitudinal shaft, $c$, the larger $n$, being permanently geared to the smaller gear wheel $p$. By means of a two way clutch, $q$, either of the gear wheels $o$ $p$, can be locked to the longitudinal shaft, $c$, causing said shaft to rotate at a speed depending on the ratios of the gearing. The longitudinal shaft $c$, drives the axles $u$, of the driving wheels, $v$, at both ends of the vehicle, reducing gear and reversing gear being provided in close proximity to said axles. The control of the vehicle is effected by means of levers on controlling pillars 1, mounted at one or both ends of the vehicle.

The controlling lever, 5, is fast on a vertical shaft 7, and the reversing lever 6, on a tube, 8, surrounding the shaft, 7, the tube and shaft carrying at their lower ends bevel wheels, 9, 10; these bevel wheels gear with bevel wheels 11, 12; respectively on two short shafts coupled by suitable universal joints, 13, 13, to longitudinal controlling shafts, $r$ $s$, which are coupled to a duplicate controller at the other end of the vehicle. One of the controlling shafts, $s$, is provided with a wheel, 3, meshing with a wheel 4, on a counter shaft provided with an eccentrically mounted projection, 14, which through the lever, 17, pivoted at 170 operates the two way clutch, $q$, by means of which one or other of the free wheels is locked to the main longitudinal shaft. On the same counter shaft and placed 90° in advance of the eccentrically mounted projection, 14, are two cranks, 16. On the driver turning the handle 5, wheels 10 and 12, shaft S, wheels 3 and 4 are also caused to rotate. Simultaneously the cranks 16, being on the same shaft as wheel 4 and therefore rotating with it, also rotate and thereby through links $17^a$ and levers 18 operate the main friction clutches $f$ and $g$. By placing the cranks at right angles to the eccentrics as above described we ensure that the friction clutches are withdrawn before the positive change speed clutch is moved over, and further, that the change speed clutch must be home in the opposite gear before the friction clutches re-engage; it is thus impossible for the driver to move the positive change speed clutch while the engines are in gear. The reversing mechanism at each end of the vehicle comprises two bevel wheels, 19, 20, loosely mounted on a counter shaft, 21, and engaging with opposite sides of the bevel wheel 22, at the end of the driving shaft. A clutch 23, is fixed to the counter shaft and causes the forward or backward movement of the vehicle by clutching the one or other of the two bevel wheels fast to the counter shaft which drives the axle of the wheel through the reducing gear, 24. In order to reverse the vehicle the lever, 6, is caused to rotate the shaft, r, which through a crank, 25 and connecting rod, causes the end of the lever 26 to be moved through a sufficient angle, which lever therefore throws over the counter shaft and causes the clutch, 23, to disengage one of the bevel wheels and engage with the other thus changing the direction of rotation of the counter shaft.

We may also in some cases drive only one axle at one end of the vehicle.

In the modification shown in Figs. 5 and 6 we place a single internal combustion engine, 30, with its crank shaft, 31, in line with the longitudinal shaft c.

The bevel gearing transmits power to the axles of the vehicle wheels and provides means for reducing the speed and reversing as in the modification above described.

We do not wish to be understood as limiting our invention to the details of construction herein shown and described, as we have merely illustrated and described a convenient embodiment of our invention which may be varied widely within the range of mechanical skill without departing from the spirit of our invention. For example, the longitudinal shaft might, if desired, be provided with a differential gear at some point in order to equalize the driving effect on the two axles; or the positive clutches on the bevel wheels at the end of the shaft might be of a ratchet type and so provide a compensating action for the possibility of unequal speeds of rotation of the axles and also obtain greater ease of engagement. Similarly, we could employ a double electro-magnetic or mechanical friction clutch instead of the two way clutch and dispense with the main clutch g herein described. Moreover, means for reversing, other than by changing the relative direction of motion of the longitudinal shaft and the axles or counter shafts might be provided, one bevel being mounted on the driven shaft and remaining permanently in mesh with the bevel on the longitudinal shaft.

Having thus described my invention what I claim as new and desire to secure by Letters Patent is:—

1. Means for transmission of power in self propelled vehicles, comprising in combination engine shafts, driven shafts, a longitudinal shaft transmitting power to the driven shafts, reducing gearing in close proximity to said driven shafts, intermediate driving shafts adapted to be clutched to the engine shafts and variable speed gears between said intermediate shafts and said longitudinal shaft, substantially as described.

2. Means for transmission of power in self propelled vehicles, comprising in combination engine shafts, driven shafts, a longitudinal shaft for transmitting power to the driven shafts, reducing gearing in close proximity to said driven shafts, intermediate driving shafts, clutches between said intermediate shafts and the engine shafts, variable speed gears between said intermediate shafts and said longitudinal shaft, and means ensuring that the engines are disconnected before a change of speed is made, substantially as described.

3. Means for transmission of power in self-propelled vehicles comprising in combination, engine shafts, driven shafts, a longitudinal shaft driving said driven shafts, variable speed gearing between said engine shafts and said longitudinal shaft and reversing gearing in close proximity to said driven shafts, substantially as described.

4. Controlling mechanism for self-propelled vehicles comprising in combination engine shafts, a longitudinal controlling shaft, driven shafts, an high speed longitudinal shaft, gearing connecting said high speed shaft with said driven shafts, a countershaft, means connecting said countershaft with the controlling shaft, intermediate shafts j, k, large and small gears on said intermediate shafts, large and small gears loosely mounted on the high speed longitudinal shaft, a double clutch for locking either one of the latter gears to the longitudinal shaft, clutches between the engine shafts and the intermediate shafts, a wheel on said counter-shaft, cranks on said wheel, a projection eccentrically mounted on said wheel and at an angle to said cranks, link means connected with said cranks, lever means connecting said clutches with said link means, and a lever connecting said double clutch to the eccentric projection; substantially as described.

5. Controlling mechanism for self-propelled vehicles comprising in combination engine shafts, an high speed longitudinal shaft, a longitudinal controlling shaft, driven shafts, change speed clutches on the high speed shaft, connections between said engine shafts and the clutches, including friction clutches connections between the high speed shaft and the driven shafts, a wheel on the controlling shaft, a countershaft, a wheel on the countershaft, a projection eccentrically mounted on said latter wheel, and two cranks on the counter shaft making an angle with the eccentric projection, and controlling the friction clutches substantially as described.

6. Reversing mechanism for self propelled vehicles, comprising in combination a longitudinal reversing shaft, a longitudinal driving shaft, a bevel wheel at the end of said driving shaft a counter shaft transverse to said driving shaft a driven shaft to which said driving shaft is geared, bevel wheels loose on said counter shaft and geared with said bevel wheel on the longitudinal driving shaft and a clutch adapted to clutch one or other of said loose bevel wheels to the counter shaft when said longitudinal reversing shaft is operated substantially as described.

7. A self propelled vehicle, comprising in combination, a longitudinal driving shaft, engine shafts situated one on each side of said shaft, intermediate shafts adapted to be clutched to said engine shafts change speed gears between said intermediate shafts and said longitudinal driving shaft driven shafts and reducing gears between the ends of said longitudinal shaft and the driven shafts, substantially as described.

In testimony whereof I have signed my name to this specification in the presence of two subscribing witnesses.

PERCY MARTIN.

Witnesses:
MARSHAL HALSTEAD,
SIDNEY WEBB.